United States Patent [19]

Sasaki et al.

[11] 4,290,936

[45] Sep. 22, 1981

[54] PROCESS FOR PREPARING POLYIMIDE SOLUTION

[75] Inventors: Yoshikazu Sasaki, Takatsuki; Hiroshi Inoue, Hirakata; Ichiro Sasaki, Chiba; Hiroshi Itatani, Chiba; Mikito Kashima, Chiba, all of Japan

[73] Assignee: UBE Industries, Ltd., Ube, Japan

[21] Appl. No.: 92,508

[22] Filed: Nov. 8, 1979

[30] Foreign Application Priority Data

Nov. 9, 1978 [JP] Japan .............................. 53-137356
Sep. 6, 1979 [JP] Japan .............................. 59113558

[51] Int. Cl.$^3$ .............................................. C08K 5/13
[52] U.S. Cl. ............................. 260/33.4 P; 528/183; 528/353
[58] Field of Search ............... 260/33.4 P; 528/183, 528/353

[56] References Cited

U.S. PATENT DOCUMENTS 3,179,630  4/1965  Endrey .................................. 528/183
3,933,745  1/1976  Bargain ........................... 260/33.4 P
4,075,171  2/1978  D'Alelio ............................... 528/353

*Primary Examiner*—Paul R. Michl
*Attorney, Agent, or Firm*—Finnegan, Henderson, Farabow, Garrett & Dunner

[57] ABSTRACT

A polyimide solution is prepared by a process wherein a tetracarboxylic acid ingredient containing at least about 80% by mole of 3,3',4,4'-biphenyltetracarboxylic acid or its functional derivative and an aromatic diamine ingredient containing at least about 50% by mole of 4,4'-diaminodiphenyl ether are polymerized at from about 100° to 300° C. in phenol or a halogenated phenolic compound; the amount of the acid and diamine ingredients being approximately equimolar to each other; whereby polymerization of the tetracarboxylic acid ingredient and the aromatic diamine ingredient is effected while being accompanied by imidation. Preferably, the polymerization accompanied by imidation is effected in a manner such that at least a second half of the polymerization is carried out in a closed reaction system. The resulting polyimide solution is suitable for making therefrom shaped articles, such as films, possessing excellent mechanical properties.

11 Claims, No Drawings

PROCESS FOR PREPARING POLYIMIDE SOLUTION

BACKGROUND OF THE INVENTION (1) Field of the Invention

This invention relates to a process for preparing a polyimide solution. More particularly, it relates to a process for preparing a polyimide solution wherein a tetracarboxylic acid ingredient mainly composed of 3,3',4,4'-biphenyltetracarboxylic acid and an aromatic diamine ingredient mainly composed of 4,4'-diaminodiphenyl ether are polymerized at an elevated temperature in phenol or a halogenated phenolic compound whereby the polymerization of the above-mentioned tetracarboxylic acid and aromatic diamine ingredients is effected while being accompanied by imidation to produce a homogeneous and clear polyimide solution.

(2) Description of the Prior Art

Polyimides have been heretofore prepared by a process wherein polymerization of a tetracorboxylic acid ingredient which an aromatic diamine ingredient for producing a polyamic acid and imidation of the polyamic acid are effected in separate two steps of operation. That is, in the first step of operation, a tetracarboxylic acid ingredient is polymerized with an aromatic diamine ingredient at a relatively low temperature, i.e., not higher than 60° C., in an organic polar solvent thereby to prepare a polyamic acid in a solution form. Thereafter, in the second step of operation, the resulting polyamic acid is converted into the corresponding polyimide in various manners.

Recently, some proposals have been made wherein a tetracarboxylic acid such as 3,3',4,4'-benzophenonetetracarboxylic acid, butanetetracarboxylic acid or 1,4,5,8-naphthalenetetracarboxylic acid and an organic diamine are polymerized at a elevated temperature in an organic polar solvent whereby the polymerization of these acid and diamine reactants is effected while being accompanied by imidation to obtain a solution of a polyimide with an enhanced degree of imidation. However, the polyimides contained in the reaction products produced by these proposed processes exhibit a low molecular weight and/or a low degree of imidation so that the reaction products can be used only in limited applications such as varnishes. Even if the reaction products are formed into shaped articles e.g., films, the resulting films have far poorer mechanical properties than the conventional polyimide films produced by a process wherein the polyamic acid solution obtained by polymerization is shaped into films and, then, the resulting polyamic acid films are imidated.

With respect to the preparation of a polyimide from 3,3',4,4'-biphenyltetracarboxylic acid and an aromatic diamine, it has been proposed in Japanese Laid-open Patent Application No. 113,597/1975 that approximately equimolar amounts of the biphenyltetracarboxylic acid and the diamine are polymerized at an elevated temperature in an organic solvent such as m-cresol and/or xylenol, while water produced by polymerization is removed from the reaction mixture, whereby the polymerization of the acid and diamine reactants is effected while being accompanied by imidation to prepare a polyimide solution. However, it is difficult or even impossible to obtain a reaction product in the form of a homogeneous clear solution containing a high molecular weight polyimide at a high concentration. The reason for this is believed to be that the prepared polyimide having a high molecular weight does not exhibit a high solubility in the m-cresol or xylenol, and thus, at least partially precipitates from the m-cresol or xylenol during the polymerization accompanied by imidation. Therefore, the resulting product as polymerized is neither homogeneous nor clear, and it is difficult to make therefrom polyimide films processing excellent mechanical properties.

SUMMARY OF THE INVENTION

It is, therefore, an object of the present invention to provide a process for preparing a polyimide solution wherein polymerization of 3,3',4,4'-biphenyltetracarboxylic acid and 4,4'-diaminodiphenyl ether is effected while being accompanied by imidation, thereby to produce a homogeneous and clear polyimide solution containing a polyimide possessing an enhanced degree of imidation, and having a molecular weight sufficiently high for making therefrom polyimide shaped articles, such as films, possessing excellent mechanical properties.

In accordance with the process of the present invention, there is provided a process for preparing a polyimide solution, which comprises the step of polymerizing a tetracarboxylic acid ingredient containing at least approximately 80% by mole, based on the tetracarboxylic acid ingredient, of 3,3',4,4'-biphenyltetracarboxylic acid or its functional derivative and an aromatic diamine ingredient containing at least approximately 50% by mole, based on the aromatic diamine ingredient, of 4,4'-diaminodiphenyl ether, at a temperature of from approximately 100° to 300° C. in phenol or a halogenated phenolic compound; the amounts of the tetracarboxylic acid ingredient and the aromatic diamine ingredient being approximately equimolar to each other; whereby the tetracarboxylic acid ingredient and the aromatic diamine ingredient are polymerized, while being accompanied by imidation, to produce a polyimide in a homogeneous solution form.

According to the process of the invention, a clear and homogeneous polyimide solution, which had dissolved therein at a high concentration a polyimide possessing an enhanced degree of imidation and having a molecular weight sufficiently high for making therefrom polyimide shaped articles possessing excellent mechanical properties, can be prepared in one single operational step. Advantageously, in order to make it easy to control the molecular weight of the resulting polyimide, the polymerization accompanied by imidation is effected in a manner such that at least a second half of the polymerization is conducted in a closed reaction system at least until both the partial pressure of steam in the closed reaction system and the content of water in the liquid reaction mixture become constant (the term "closed reaction system" is defined hereinafter). According to this process wherein at least the second half of the polymerization is effected in the closed reaction system, a polyimide having a desired degree of polymerization, i.e., a polyimide solution having a desired rotation viscosity, is produced in an exactly controllable manner and with a high reproducibility. Thus, polyimide films possessing a high and uniform quality can be obtained from the polyimide solution.

DESCRIPTION OF THE PREFERRED EMBODIMENTS

The polyimide in the polyimide solution prepared by the process of the invention is predominantly comprised of the recurring units expressed by the formula:

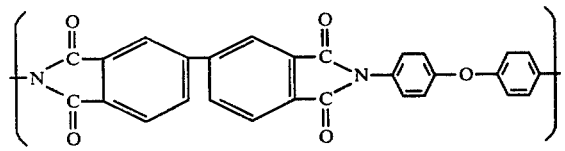

The polyimide usually exhibits a degree of imidation of at least 90%, particularly at least 95% and more particulary at least 98%, and a logarithmic viscosity (as measured at 50° C. on a solution of 0.5 g polymer in 100 ml of p-chlorophenol) of from about 0.7 to 6, particularly from 0.8 to 4.

The clear and homogeneous solution prepared by the process of the invention contains the polyimide usually at a concentration of not more than 30% by weight, particularly from 5 to 25% by weight. If desired, the solution can be diluted into any desired concentration by adding thereto phenol or a hologenated phenol compound, or concentrated, for example, by evaporating the solvent. The polyimide solution exhibits good stability for long preservation. That is, during the preservation thereof, the polymer does not tend to precipitate, nor does the solution become turbid or opaque.

Polyimide films possessing excellent mechanical properties can be readily made from the above-mentioned polyimide solution by a process wherein the solution is flow-cast into a liquid film, followed by evaporation of the solvent from the liquid film. The polyimide films usually have a tensile strength at break of at least 16 kg/mm$^2$, particularly in the range of from 17 to 30 kg/mm$^2$, and an elongation of from 20 to 100%. This is in marked contrast to the fact that polyimide films, which are made from a solution prepared by the conventional process wherein polymerization of the acid and diamine reactants is effected while being accompanied by imidation, have a tensile strength at break of at most 10 to 15 kg/mm$^2$.

The tetracarboxylic acid ingredient used in the process of the invention comprises at least approximately 80% by mole, preferably 90 to 100% by mole, based on the total mole of the tetracarboxylic acid ingredient, of 3,3',4,4'-biphenyltetracarboxylic acid or its functional derivative, such as an acid anhydride, an ester or a mixture thereof, and not more than 20% by mole, preferably 0 to 10% by mole, based on the total mole of the tetracarboxylic acid ingredient, of other tetracarboxylic acids and their functional derivatives. Among 3,3',4,4'-biphenyltetracarboxylic acid and its functional derivatives, 3,3'4,4'-biphenyltetracarboxylic dianhydride is optimum.

The tetracarboxylic acids and their functional derivatives, which can be used in combination with the 3,3',4,4'-biphenyltetracarboxylic acid or its functional derivative, include, for example, 2,3,3',4'-biphenyl tetracarboxylic acid, 2,2',3,3'-biphenyltetracarboxylic acid, 3,3',4,4'-benzophenonetetracarboxylic acid, bis(3,4-dicarboxyphenol)methane, 2,2-bis(3,4-dicarboxyphenyl)propane, bis(3,4-dicarboxyphenyl)ether, bis(3,4-dicarboxyphenyl)thioether, bis(3,4-dicarboxyphenyl)sulfone, 2,3,6,7-naphthalenetetracarboxylic acid, pyromellitic acid and their functional derivatives, such as acid anhydrides and esters. These tetracarboxylic acids and their functional derivatives may be used alone or in combination. Of these tetracarboxylic acids and their functional derivatives, tetracarboxylic dianhydrides are preferable.

When the tetracarboxylic acid ingredient to be polymerized with the aromatic diamine ingredient contains less than 80% by mole of 3,3',4,4'-biphenyltetracarboxylic acid or its functional derivative, at least one of the following defects develops. That is, a polymer precipitates or the reaction mixture becomes turbid and opaque during the step of polymerization; the resulting polyimide possesses a low molecular weight; or, when the resulting polyimide solution is cooled, the polymer precipitates. Consequently, the resulting polyimide solution cannot be formed into films possessing excellent mechanical properties.

The aromatic diamine ingredient used in the process of the invention comprises at least approximately 50% by mole, preferably at least approximately 70% by mole, more preferably from 80 to 100% by mole and even more preferably from 90 to 100% by mole, based on the total mole of the aromatic diamine ingredient, of 4,4'-diaminodiphenyl ether. The remaining part of the aromatic diamine ingredient may be other aromatic diamines. When the proportion of 4,4'-diaminodiphenyl ether to the total aromatic diamine ingredient is less than approximately 50% by mole, the resulting polyimide solution cannot be formed into films possessing excellent mechanical properties.

The aromatic diamines, which can be used in combination with 4,4'-diaminodiphenyl ether, include, for example, 4,4'-diaminodiphenylmethane, 4,4'-diaminodiphenylpropane, benzidine, 3,3'-dimethylbenzidine, 4,4'-diaminodiphenylsulfide, 4,4'-diaminodiphenylsulfone, metaphenylenediamine, paraphenylenediamine, 3,3'-diaminodiphenylmethane, 3,3'-diaminodiphenylpropane, 3,3'-diaminodiphenylsulfide and 3,3'-diaminodiphenylsulfone.

A combination of 3,3',4,4'-biphenyltetracarboxylic acid or its functional derivative alone as the tetracarboxylic acid ingredient with 4,4'-diaminodiphenyl ether alone as the aromatic diamine ingredient is optimum.

The amounts of the tetracarboxylic acid ingredient and the aromatic diamine ingredient should be approximately equimolar to each other. The ratio of the acid ingredient to the diamine ingredient may be varied in the range of from 0.9 to 1.1 by mole, preferably from 0.95 to 1.05 by mole. It should be noted, however, that, as the ratio of the acid ingredient to the diamine ingredient becomes more distant from 1.0, the molecular weight of the resulting polyimide becomes low.

The reaction medium used in the process of the invention is phenol or a halogenated phenolic compound. By the term "halogenated phenolic compound" used herein is meant a compound which is represented by the formula:

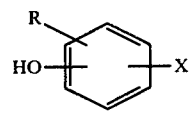

wherein X is halogen selected from chlorine, bromine, fluorine and iodine (preferably chlorine and bromine), and R is hydrogen or a lower alkyl group having 1 to 4 carbon atoms, such as methyl, ethyl, propyl and isopropyl. Preferably, the halogenated phenolic compound has a melting point of not higher than approximately 100° C., particularly not higher than 80° C. and a boiling point of not higher than 300° C. at normal pressure, particularly not higher than 280° C. at normal pressure.

The halogenated phenolic compounds used include, for example, o-chlorophenol, m-chlorophenol, p-chlorophenol, o-bromophenol, m-bromophenol, p-bromophenol, 2-chloro-4-hydroxytoluene, 2-chloro-5-hydroxytoluene, 3-chloro-6-hydroxytoluene, 4-chloro-2-hydroxytoluene, 2-bromo-4-hydroxytoluene, 2-bromo-5-hydroxytoluene, 3-bromo-6-hydroxytoluene and 4-bromo-2-hydroxytoluene. Of these halogenated phenolic compounds, preferable are p-chlorophenol, m-chlorophenol, p-bromophenol, m-bromophenol, 2-chloro-4-hydroxytoluene, 2-chloro-5-hydroxytolunne, 3-chloro-6-hydroxytoluene and their mixtures.

Phenol or the halogenated phenolic compound may be used in combination with a minor amount, usually less than 30% by volume, particularly less than 15% by volume, based on the total volume of the reaction mediums, of another organic polar solvent. If a larger amount of another organic polar solvent is used together with phenol or the halogenated phenolic compound, the resulting polyimide solution is liable to be opaque and non-homogeneous, and films possessing excellent mechanical properties are difficult to prepare.

The tetracarboxylic acid ingredient and the aromatic diamine ingredient are polymerized in phenol or the halogenated phenolic compound at a temperature of from approximately 100° to 300° C., preferably from 120° to 280° C. and more preferably from 150° to 250° C., if desired, while the water produced is removed from the reaction mixture. If the reaction temperature is lower than approximately 100° C., the polymerization of the acid and diamine reactants is accompanied by imidation only to a minor extent, i.e., the resulting polymer contains, in addition to the imide bonds, a salient amount of the amide-acid bonds. Such a polymer tends to precipitate in the solution, and in some cases, the solution exhibits a poor stability for preservation. In contrast, if the reaction temperature exceeds approximately 300° C., the resulting polymer tends to be cross-linked, and thus, to gel. Consequently, the polymer solution is liable to exhibit poor fluidity or homogeneity.

It is preferable that the concentration of the total of the tetracarboxylic acid ingredient and the aromatic diamine ingredient in the reaction medium be in the range of from 2 to 30% by weight, particularly from 3 to 25% by weight and more particularly from 5 to 20% by weight.

The manner, whereby the temperature of the solution of the acid and diamine ingredients is raised to the desired reaction temperature, is not particularly limited. For example, the temperature of the reactant solution may be raised from the ambient temperature to the reaction temperature over a period of from approximately 0.2 to 5 hours, preferably from 0.5 to 2 hours. The reaction time varies depending upon the particular reaction temperature employed, and is usually in the range of from approximately 5 minutes to 70 hours, preferably from 10 minutes to 60 hours. The reaction temperature may be either constant over the entire reaction time or varied within the above-mentioned reaction temperature range, although the former is preferable. The reaction pressure may be normal, superatmospheric or subatmospheric.

Water produced during the polymerization may or may not be removed from the reaction mixture. However, the removal of such water is advantageous to some extent in the case where the reaction is effected at a temperature lower than approximately 150° C. or within a relatively short period of time.

As mentioned hereinbefore, the polymerization of the acid and diamine ingredients, accompanied by imidation, is preferably effected in a manner such that at least a second half of the polymerization is conducted in a closed reaction system at least until both the partial pressure of steam in the closed reaction system and the content of water in the reaction mixture become constant. In other words, the polymerization is preferably effected in two half stages: in the first half stage, the polymerization is conducted either in a closed reaction system or in an open reaction system, and; in the successive second half stage, the polymerization is continued in a closed reaction system at least until both the partial pressure of steam in the closed reaction system and the content of water in the reaction mixture become contant.

By the term "closed reaction system" used herein is meant a reaction system, wherein the water produced during the polymerization accompanied by imidation is not freely evaporated off in the form of steam from the reaction mixture nor freely removed from the reaction system, but the water is substantially kept in the reaction system or only partially removed from the reaction system so that the partial pressure of water at the time the polymerization is completed be controlled. By the term "open reaction system" used herein is meant a reaction system, wherein the water produced during the polymerization accompanied by imidation is substantially freely evaporated off from the reaction mixture and removed from the reaction system without control of the partial pressure of steam in the reaction system.

In the first half stage, the reactant solution in phenol or the halogenated phenolic compound is heated to a temperature of from approximately 100° to 200° C., preferably from 120° to 195° C., over a period of from approximately 0.1 to 5 hours, preferably from 0.1 to 3 hours, thereby to prepare a clear and homogeneous solution containing low molecular weight polyimide. The resulting solution usually has a rotation viscosity (as measured at 140° C.) not higher than 50 poise, particularly not higher than 15 poise.

In general, when the first half stage reaction is conducted in an open reaction system, the reaction time is shortened, and, when it is conducted in a closed reaction system, the reaction time is prolonged.

It is preferable that the temperature, to which the reactant solution is heated in the first half stage, is lower than the boiling point of the reaction medium, particularly at least from 2° to 5° C. lower than the boiling point of the reaction medium. The reaction pressure in the first half stage may be normal, superatmospheric or subatmospheric.

In the subsequent second half stage of the polymerization, the liquid reaction product obtained in the above-mentioned first stage is maintained at a temperature of approximately 100° to 300° C. in a closed reaction system until both the partial pressure of steam in the closed reaction system and the content of water in the liquid reaction product becomes constant, whereby a polyimide solution possessing the desired rotation viscosity is obtained. If desired, prior to or at the beginning of the second half stage conducted in the closed reaction system, water may be incorporated in the liquid reaction mixture. When the first half stage is also conducted in a closed reaction system and both the first and second stages are incessantly continued, water may be incorporated prior to the first half stage or during the first or second half stage.

As hereinbefore defined, the term "closed reaction system" refers to the reaction system wherein the water produced is not freely moved therefrom but substantially kept therein. More particularly, it refers to the reaction system wherein the steam present in the gaseous phase of the reaction system is not continuously nor uninterruptedly removed from the reaction system. A gaseous material may be temporarily introduced into or withdrawn from the reaction system, for example, in order to adjust the total pressure in the closed reaction system. Furthermore, a liquid material may be introduced into the reaction system or the liquid reaction mixture or product may be withdrawn from the reaction system. It is preferable, however, that no material transfer occurs between the inside of the reaction system and the outside thereof.

The liquid reaction product, which is obtained in the first half stage and used for the second half stage, preferably has a rotation viscosity (as measured at 140° C.) of not more than 50 poise, particularly not more than 20 poise, and a polymer concentration of from 2 to 30% by weight, particularly from 5 to 25% by weight.

The reaction temperature in the second half stage is in the range of from approximately 100° to 300° C., as hereinbefore mentioned. The reaction temperature is preferably in the range of from 100° C. to the boiling point at normal pressure of the reaction medium, and more preferably in the range of from 120° C. to a temperature 5° C. lower than the boiling point at normal pressure of the reaction medium. It is preferable that the reaction temperature is maintained constant over the entire period of the second half stage. The reaction time is usually in the range of from approximately 0.1 to 60 hours, preferably from 0.2 to 50 hours.

In the second half stage, the partial pressure of steam in the reaction system reaches a constant value falling usually in the range of from 0.01 to 20 kg/cm$^2$, preferably from 0.02 to 10 kg/cm$^2$ and more preferably from 0.1 to 8 kg/cm$^2$. The content of water in the liquid reaction mixture reaches a constant value falling usually in the range of from 0.01 to 10% by weight, preferably from 0.1 to 8% by weight and more preferably from 0.2 to 5% by weight. The higher the partial pressure of steam and the larger the content of water, the lower the rotation viscosity of the resulting polyimide solution, i.e., the lower the molecular weight of the polyimide in the solution.

The partial pressure of steam in the reaction system and the content of water in the reaction mixture, which pressure and content are reached during the second half stage, can be voluntarily adjusted by the amount of water added to the liquid reaction mixture prior to the first half stage or during the first half or second half stage. In other words, the rotation viscosity of the resulting polyimide solution can be voluntarily adjusted by the amount of water added. The amount of water is preferably not more than approximately 0.8 g per g of the polyimide to be finally produced, particularly from 0.001 to 0.6 g per g of the polyimide to be finally produced.

The first half stage and the second half stage may be conducted substantially continually in one and the same reaction system. Alternatively, these two half stages may be conducted sequentially in two separate reaction systems. The first half stage and the second half stage may be conducted either in a continuous or batchwise manner.

It is preferable that the two half stages are conducted in an inert gaseous atmosphere such as a nitrogen atmosphere.

The clear and homogeneous polyimide solution obtained by the process of the invention contains from approximately 5 to 30% by weight of polyimide. The polyimide solution possesses a rotation viscosity (as measured at 140° C.) of from 1 to 50,000 poise, particularly from 5 to 10,000 poise, and more particularly from 10 to 5000 poise, although the viscosity varies depending upon the particular concentration of polyimide.

When the polyimide solution containing approximately 10% by weight of polyimide is heated to a temperature between approximately 50° C. and 200° C., particularly 70° and 150° C., the polyimide solution exhibits a rotation viscosity suitable for flow-casting films therefrom.

The polyimide contained in the above-mentioned solution exhibits a high degree of imidation and a high logarithmic viscosity, as hereinbefore mentioned. The polyimide is stable, that is, the crosslinking and the degradation do not occur or occur only to a negligible extent, in the temperature range of from room temperature to 200° C. Thus, the polyimide solution can be preserved for a long period of time, for example, for several months or more at a temperature not higher than 50° C.

The polyimide solution prepared by the process of the present invention is useful for films and other shaped articles wherein excellent mechanical properties are desired. The solution may also be used as varnishes for electric wire coating and as thermal resistant adhesives.

The invention will be further illustrated by the following examples and comparative examples, wherein percents are by weight unless otherwise specified.

In the following examples and comparative examples, the rotation viscosity of a polyimide solution was determined by using a rotation viscometer (trade name VISMETRON, supplied by Tokyo Keisoku K.K.). The logarithmic viscosity of polyimide was determined at a temperature of 50° C. on a solution of 0.5 g polymer in 100 ml of p-chlorophenol.

The degree of imidation was determined by infrared spectroscopic analysis wherein the absorption peak of the imide linkage appearing at 1780 cm$^{-1}$ was observed.

The partial pressure of steam was calculated by subtracting from the total pressure the total of the vapor pressure of the solvent used and the partial pressure of nitrogen initially introduced into the reactor. The content of water in the polymer solution was measured by using a Karl Fischer type meter (trade name "MK-SS" supplied by Kyoto Electronic Industry Co.).

EXAMPLE 1

7.356 g (about 0.025 mole) of 3,3',4,4'-biphenyltetracarboxylic dianhydride and 5.006 g (about 0.025 mole) of 4,4'-diaminodiphenyl ether were incorporated into 114.60 g of p-chlorophenol. Then, the mixture was, while being stirred, heated to a temperature of 160° C. over a period of one hour, and then, maintained at that temperature for a period of one hour while water produced was removed from the reaction mixtrue, whereby the polymerization of the tetracarboxylic dianhydride and the diaminodiphenyl ether was effected while being accompanied by imidation. The resultant solution was viscous and clear and contained about 9.1% of polyimide. The degree of imidation was at least 95%. The rotation viscosity (as measured at 50°) of the polyimide solution and the logarithmic viscosity of the polyimide in the solution are shown in Table I, below.

The above-mentioned polyimide solution was heated to a temperature of 100° C. and, then, filtered. The filtered solution was flow-cast on a glass plate into a liquid film of a uniform thickness. The liquid film was maintained at a temperature of approximately 140° C. under a pressure of 1 mmHg for a period of approximately one hour by using a vacuum dryer, thereby to evaporate p-chlorophenol therefrom. Then, the film was gradually heated to a temperature of 300° C. by using a hot air dryer thereby to completely remove p-chlorophenol therefrom.

The resulting polyimide film had the thickness, the tensile strength at break and the elongation, shown in Table I, below.

EXAMPLES 2 through 4

Following a procedure similar to that mentioned in EXAMPLE 1, polyimide solutions were prepared wherein the reaction temperature and the reaction time were varied as shown in Table I, below, with all other conditions remaining substantially the same. The rotation viscosities of the polyimide solutions, the logarithmic viscosities and degrees of imidation, of the polyimides, and the appearances of the polyimide solutions are shown in Table I, below.

Following a procedure similar to that mentioned in EXAMPLE 1, polyimide films were prepared from the above-mentioned polyimide solutions. The properties of the resultant polyimide films are shown in Table I, below.

EXAMPLES 5 and 6

Following a procedure similar to that mentioned in EXAMPLE 3, polyimide solutions were prepared wherein the amount of 3,3',4,4'-biphenyltetracarboxylic dianhydride, i.e., 7.356 g, was changed to 10.604 g in EXAMPLE 5 and 14.003 g in EXAMPLE 6, and the amount of 4,4'-diaminodiphenyl ether, i.e., 5.006 g, was changed to 7.216 g in EXAMPLE 5 and 9.530 g in EXAMPLE 6, with all other conditions remaining substantially the same. The concentration of polyimide in the resultant polyimide solutions was about 12.6% and 16.0% in EXAMPLES 5 and 6, respectively. The properties of these polyimides and polyimide solutions are shown in Table I, below.

Polyimide films were prepared from the polyimide solutions in a manner similar to that mentioned in EXAMPLE 3. The properties of the resultant polyimide films are shown in Table I, below.

EXAMPLE 7

Following a procedure similar to that mentioned in EXAMPLE 1, a polyimide solution was prepared wherein a mixture of 6.620 g of 3,3',4,4'-biphenyltetracarboxylic dianhydride and 0.736 g of 2,3,3',4'-biphenyltetracarboxylic dianhydride was used instead of 7,356 g of 3,3',4,4'-biphenyltetracarboxylic dianhydride. Furthermore, the reaction temperature and the reaction time were changed as shown in Table I, below. All other conditions remained substantially the same. The properties of the resultant polyimides and polyimide solutions are shown in Table I, below.

A polyimide film was prepared from the polyimide solution in a manner similar to that mentioned in EXAMPLE 1. The properties of the resultant polyimide film are shown in Table I, below.

EXAMPLES 8 through 11

Following a procedure similar to that mentioned in EXAMPLE 1, polyimide solutions were prepared wherein the reaction medium, the reaction temperature and the reaction time were varied as shown in Table I, below, with all other conditions remaining substantially the same. The properties of the resultant polyimides and polyimide solutions are shown in Table I, below.

Polyimide films were prepared from the polyimide solutions in a manner similar to that mentioned in EXAMPLE 1. The properties of the resultant polyimide films are shown in Table I, below.

TABLE I

| | Polymerization and imidation conditions | | | Polyimide solution formed | | | | | Polyimide Film | | |
|---|---|---|---|---|---|---|---|---|---|---|---|
| | | | | Property of polyimide solution | | | Property of polyimide | | | | |
| Example No. | Reaction medium | Reaction temperature (°C.) | Reaction time (min.) | Appearance | Polyimide concentration (%) | Rotation viscosity at 50° C. (cp) | Logarithmic viscosity at 50° C. | Degree of imidation (%) | Thickness ($\mu$) | Tensile strength at break (kg/mm$^2$) | Elongation (%) |
| 1 | p-chlorophenol | 160 | 60 | Clear, viscous | 9.1 | more than 100,000 | 1.76 | more than 95 | 21–28 | 22.4 | 64 |
| 2 | p-chlorophenol | 170 | 60 | Clear, viscous | 9.1 | more than 100,000 | 2.38 | more than 98 | 28–30 | 22.1 | 98 |
| 3 | p-chlorophenol | 180 | 60 | Clear, viscous | 9.1 | more than 100,000 | 2.25 | more than 98 | 26–30 | 21.4 | 75 |
| 4 | p-chlorophenol | 190 | 10 | Clear, viscous | 9.1 | more than 100,000 | 0.93 | more than 98 | 23–25 | 23.1 | 85 |
| 5 | p-chlorophenol | 180 | 60 | Clear, viscous | 12.6 | more than 100,000 | 2.57 | more than 98 | 30–33 | 21.9 | 81 |
| 6 | p-chlorophenol | 180 | 60 | Clear, viscous | 16.0 | more than 100,000 | 2.36 | more than 98 | 45–49 | 22.0 | 77 |
| 7 | p-chlorophenol | 180 | 60 | Clear, viscous | 9.1 | more than 100,000 | 2.20 | more than 98 | 31–36 | 19.2 | 74 |
| 8 | o-chlorophenol | 170 | 40 | Clear, viscous | 9.1 | more than 100,000 | 1.89 | more than 98 | 34–40 | 19.7 | 73 |
| 9 | m-chlorophenol | 170 | 40 | Clear, viscous | 9.1 | 40,000 | 1.54 | more than 98 | 35–42 | 21.3 | 80 |
| 10 | 4-bromo- | 175 | 60 | Clear, | 9.1 | more than | 2.03 | more than | 45–52 | 18.6 | 69 |

TABLE I-continued

| | Polymerization and imidation conditions | | | Polyimide solution formed | | | | | | |
|---|---|---|---|---|---|---|---|---|---|---|
| | | | | Property of polyimide solution | | Property of polyimide | | Polyimide Film | | |
| Example No. | Reaction medium | Reaction temperature (°C.) | Reaction time (min.) | Appearance | Polyimide concentration (%) | Rotation viscosity at 50° C. (cp) | Logarithmic viscosity at 50° C. | Degree of imidation (%) | Thickness (μ) | Tensile strength at break (kg/mm²) | Elongation (%) |
| 11 | phenol 3-chloro-6-hydroxytoluene | 175 | 60 | viscous Clear, viscous | 9.1 | 100,000 12,000 | 1.76 | 98 more than 98 | 30-38 | 17.5 | 57 |

*In Example 7, 3,3',4,4'-biphenyltetracarboxylic dianhydride and 2,3,3',4'-biphenyltetracarboxylic dianhydride are used in combination as a tetracarboxylic acid ingredient at the ratio of 9:1, respectively.

COMPARATIVE EXAMPLE 1

Following a procedure similar to that mentioned in EXAMPLE 5, polymerization of 3',3',4,4'-biphenyltetracarboxylic dianhydride and 4,4'-diaminodiphenyl ether, accompanied by imidation, was carried out, wherein m-cresol was used in stead of p-chlorophenol. All other conditions remained substantially the same. The properties of the resultant liquid reaction product are shown in Table II, below.

As the liquid reaction product contained a polymer precipitate therein, the reaction product could not be formed into a film in a manner similar to that mentioned in EXAMPLE 5.

COMPARATIVE EXAMPLES 2 through 5

Following a procedure similar to that mentioned in EXAMPLE 1, polymerization of 3,3',4,4'-biphenyltetracarboxylic dianhydride and 4,4'-diaminodiphenyl ether, accompanied by imidation, was carried out, wherein the reaction medium, the reaction temperature and the reaction time were varied as shown in Table II, below. All other conditions remained substantially the same. The properties of the resultant liquid reaction products are shown in Table II, below.

It was difficult to prepare films exhibiting good mechanical properties from the above-mentioned liquid reaction products in a manner similar to that mentioned in EXAMPLE 1. This is because these liquid reaction products were defective. That is, the liquid reaction products in COMPARATIVE EXAMPLES 4 and 5 contained unreacted 3,3',4,4'-biphenyltetracarboxylic dianhydride remaining therein, the liquid reaction product in COMPARATIVE EXAMPLE 2 had a polymer precipitate which occurred therein when the liquid reaction product was cooled to ambient temperature, and the liquid reaction product in COMPARATIVE EXAMPLE 3 had no polymer which has a molecular weight sufficiently high for making therefrom a film possessing good mechanical properties.

COMPARATIVE EXAMPLES 6 through 8

Following a procedure similar to that mentioned in EXAMPLE 1, the tetracarboxylic acid ingredients and the aromatic diamine ingredients, which are shown in Table II, below, were polymerized while being accompanied by imidation. The reaction temperature and the reaction time were varied as shown in Table II, below. All other conditions remained substantially the same. The properties of the resultant liquid reaction products are shown in Table II, below.

The liquid reaction products in COMPARATIVE EXAMPLES 6 and 7 had polymer precipitates which occurred therein, and hence, could not be used for the preparation of films therefrom.

The liquid reaction product in COMPARATIVE EXAMPLE 8 could be formed into a film having a thickness of from 33 to 40 microns in a manner similar to that mentioned in EXAMPLE 1, but the film exhibited only a tensile strength at break of 11.3 kg/mm².

TABLE II

| | Polymerization and imidation conditions | | | | | Property of liquid reaction product | | |
|---|---|---|---|---|---|---|---|---|
| Comparative Examples No. | Tetracarboxylic acid ingredient *1 | Aromatic diamine ingredient *2 | Reaction midium | Reaction temperature (°C.) | Reaction time (min.) | Appearance | Polymer concentration (%) | Rotation viscosity at 50° C. (cp) |
| 1 | S-BPDA | DADE | m-cresol | 160 | 40 | polymer precipitated, opaque | 12.6 | Impossible to measure |
| 2 | S-BPDA | DADE | m-cresol | 180 | 60 | when cooled, gelled became opaque | 9.1 | Impossible to measure |
| 3 | S-BPDA | DADE | o-cresol | 180 | 20 | Transparent | 9.1 | 3700 |
| 4 | S-BPDA | DADE | o-dichlorobenzene | 170 | 30 | S-BPDA remained: when cooled, polymer precipitated | 9.1 | Impossible to measure |
| 5 | S-BPDA | DADE | p-dichlorobenzene | 170 | 50 | S-BPDA remained: when cooled, polymer precipitated | 9.1 | Impossible to measure |
| 6 | PMDA | DADE | p-chlorophenol | 155 | 50 | Orange polymer precipitated at 120° C. | 9.1 | Impossible to measure |
| 7 | S-BPDA | p-phenylene diamine | p-chlorophenol | 170 | 30 | Polymer precipitated at 160° C. | 9.1 | Impossible to measure |
| 8 | S-BPDA | DADM | p-chloro- | 170 | 60 | Transparent, viscous | 9.1 | More than |

TABLE II-continued

| Comparative Examples No. | Polymerization and imidation conditions ||||| Property of liquid reaction product |||
|---|---|---|---|---|---|---|---|---|
| | Tetracarboxylic acid ingredient *1 | Aromatic diamine ingredient *2 | Reaction midium | Reaction temperature (°C.) | Reaction time (min.) | Appearance | Polymer concentration (%) | Rotation viscosity at 50° C. (cp) |
| | | | phenol | | | | | 100,000 |

*1 S-BPDA = 3,3',4,4'-biphenyltetracarboxylic dianhydride
PMDA = Pyromellitic dianhydride
*2 DADE = 4,4'-diaminodiphenyl ether
DADM = 4,4'-diaminodiphenylmethane

EXAMPLES 12 through 17

14.71 g (about 0.05 mole) of 3,3',4,4'-biphenyltetracarboxylic dianhydride, 10.01 g (about 0.05 mole) of 4,4'-diaminodiphenyl ether and 181.30 g of p-chlorophenol were placed in an open glass reactor equipped with a cooling jacket. The content was heated to a temperature of 160° C. over a period of one hour while being stirred, whereby the first half stage of the of polymerization accompanied by imidation was conducted. The polyimide-containing solution, so obtained, was homogeneous and clear and exhibited a rotation viscosity of 11 poises, as measured at 140° C. The polyimide contained in the solution had a logarithmic viscosity of 1.02, and the degree of imidation was more than 90%.

11 g (about 8 ml) of the above-mentioned polyimide-containing solution was placed in a glass-coated autoclave having an inner diameter of 1.5 cm and a depth of 10 cm. Furthermore, a predetermined amount of water, as shown in Table III, below, was incorporated into the autoclave (no water was incorporated in EXAMPLE 12). Thereafter, the gaseous phase inside the autoclave was replaced by gaseous nitrogen, and then, the autoclave was closed. Then, the content was heated to a temperature of 180° C. and, thereafter, maintained at that temperature, thereby to complete the second half stage of the polymerization accompanied by imidation. During the second half stage, the rotation viscosity of the reaction mixture increased with the lapse of time, and, when 20 hours elapsed, the rotation viscosity became constant. At that time 20 hours elapsed, the partial pressure of water (steam), the content of water in the liquid reaction product, the rotation viscosity (as measured at 140° C.) of the liquid reaction product and the logarithmic viscosity of the polyimide in the liquid reaction product were determined. Results are shown in Table III, below.

The liquid reaction product obtained in EXAMPLE 12 was heated to a temperature of 100° C. and, then, flow-cast on a glass plate into a liquid film of a uniform thickness. The liquid film was maintained at a temperature of approximately 140° C., under a pressure of 1 mmHg, for a period of approximately one hour, by using a vacuum dryer, thereby to evaporate a substantial part of p-chlorophenol therefrom. Then, the film was gradually heated to a temperature of 300° C. by using a hot air dryer, thereby to completely remove p-chlorophenol therefrom. The resultant polyimide film had a thickness of about 32 microns, a tensile strength at break of 20.5 kg/cm² and an elongation of 86%.

Likewise, polyimide films were prepared from the liquid reaction products obtained in EXAMPLES 13 through 17. The resultant polyimide films had properties approximately the same as those of the film of EXAMPLE 12.

EXAMPLES 18 through 20

Following a procedure similar to that mentioned in EXAMPLE 12, polyimide solutions were prepared wherein 3-chloro-6-hydroxytoluene was used as the reaction medium instead of p-chlorophenol and the reaction temperature was varied to 170° C. Furthermore, a predetermined amount of water, as shown in Table III, below, was incorporated in the reaction mixture prior to the second half stage of the polymerization in examples 19 and 20. All other conditions remained substantially the same. The properties of the resultant polyimide solutions and polyimides are shown in Table III, below.

Polyimide films were prepared from the above-mentioned polyimide solutions in a manner similar to that mentioned in EXAMPLE 12. The resultant polyimide films had a tensile strength at break of 19.1 kg/cm² and an elongation of 94%.

TABLE III

| | Reaction conditions in second half stage |||| State of reaction system 20 hours after ||| Rotation viscosity of liquid reaction product at 140° C. (poise) | Logarithmic viscosity of polyimide |
|---|---|---|---|---|---|---|---|---|---|
| Example No. | Reaction medium | Amount of water added (ml) | Reaction temperature (°C.) | Reaction time (hr) | Water content in liquid reaction product (%) | Total pressure (kg/cm²) | Partial pressure of steam (kg/cm²) | | |
| 12 | P-chlorophenol | 0 | 180 | 20 | 0.92 | 2.0 | 0.6 | 900 | 2.01 |
| 13 | " | 0.06 | 180 | 20 | 1.45 | 2.3 | 0.9 | 760 | 1.98 |
| 14 | " | 0.18 | 180 | 20 | 1.57 | 2.8 | 1.4 | 330 | 1.80 |
| 15 | " | 0.24 | 180 | 20 | 1.72 | 3.7 | 2.3 | 120 | 1.58 |
| 16 | " | 0.36 | 180 | 20 | 2.45 | 4.3 | 2.9 | 82 | 1.50 |
| 17 | " | 0.48 | 180 | 20 | 2.68 | 5.0 | 3.6 | 37 | 1.33 |
| 18 | 3-chloro-6-hydroxytoluene | 0 | 170 | 20 | 0.81 | 1.3 | 0.2 | 300 | 1.78 |
| 19 | 3-chloro-6-hydroxytoluene | 0.15 | 170 | 20 | 1.19 | 2.3 | 1.2 | 68 | 1.46 |
| 20 | 3-chloro-6- | 0.30 | 170 | 20 | 1.73 | 3.1 | 2.0 | 38 | 1.34 |

TABLE III-continued

| | Reaction conditions in second half stage | | | State of reaction system 20 hours after | | | Rotation viscosity of liquid reaction product at 140° C. (poise) | Logarithmic viscosity of polyimide |
|---|---|---|---|---|---|---|---|---|
| Example No. | Reaction medium | Amount of water added (ml) | Reaction temperature (°C.) | Reaction time (hr) | Water content in liquid reaction product (%) | Total pressure (kg/cm²) | Partial pressure of steam (kg/cm²) | |
| | hydroxy-toluene | | | | | | | |

EXAMPLES 21 through 24

Following a procedure similar to that mentioned in EXAMPLE 18, polyimide solutions were prepared wherein phenol was used as the reaction medium instead of 3-chloro-6-hydroxytoluene. Futhermore, a predetermined amount of water, as shown in Table IV, below, was incorporated in the reaction mixture prior to the second half stage of the polymerization in EXAMPLES 22, 23 and 24. All other conditions remained substantially the same. The results are shown in Table IV, below.

TABLE IV

| | Reaction conditions in second half stage | | | | | State of reaction system 20 hours after | | | Rotation viscosity of liquid reaction product at 140° C. (poise) | Logarithmic viscosity of polyimide |
|---|---|---|---|---|---|---|---|---|---|---|
| Example No. | Reaction medium | Polyimide concentration (%) | Amount of water added (ml) | Reaction temperature (°C.) | Reaction time (hr) | Water content in liquid reaction product (%) | Total pressure (kg/cm²) | Partial pressure of steam (kg/cm²) | | |
| 21 | Phenol | Approximately 12 | 0 | 170 | 20 | 0.86 | 1.4 | 0.3 | 1050 | 2.10 |
| 22 | " | Approximately 12 | 0.1 | 170 | 20 | 1.21 | 1.9 | 0.8 | 420 | 1.92 |
| 23 | " | Approximately 12 | 0.2 | 170 | 20 | 1.69 | 2.4 | 1.3 | 220 | 1.78 |
| 24 | " | Approximately 12 | 0.3 | 170 | 20 | 1.85 | 2.8 | 1.7 | 105 | 1.64 |
| 25 | " | Approximately 10 | 0 | 170 | 20 | 0.87 | 1.3 | 0.2 | 480 | 2.06 |
| 26 | " | Approximately 10 | 0.1 | 170 | 20 | 1.34 | 1.9 | 0.8 | 98 | 1.91 |
| 27 | " | Approximately 10 | 0.2 | 170 | 20 | 1.37 | 2.2 | 1.1 | 40 | 1.83 |
| 28 | " | Approximately 10 | 0.3 | 170 | 20 | 1.85 | 2.9 | 1.8 | 20 | 1.62 |
| 29 | " | Approximately 15 | 0 | 170 | 20 | 0.89 | 1.4 | 0.3 | 4600 | 2.08 |
| 30 | " | Approximately 15 | 1.5 | 170 | 20 | 1.68 | 2.1 | 1.0 | 1880 | 1.92 |

EXAMPLES 25 through 28

Following a procedure similar to that mentioned in EXAMPLE 21, polyimide solutions were prepared wherein the following conditions were employed with all other conditions remaining substantially the same.

Amount of 3,3',4,4'-biphenyltetracarboxylic dianhydride: 8.00 g
Amount of 4,4'-diaminodiphenyl ether: 5.44 g
Amount of reaction medium (phenol): 121 g
Amount of water (per 11 g of liquid reaction product obtained in first half stage) added prior to second half stage: shown in Table IV, below.

The results are shown in Table IV, below.

EXAMPLES 29 and 30

Following a procedure similar to that mentioned in EXAMPLE 21, polyimide solutions were prepared wherein the amount of phenol was varied to 76.2 g. Furthermore, a predetermined amount of water, as shown in Table IV, below, was incorporated in the reaction mixture prior to the second half stage in EXAMPLE 30. All other conditions remained substantially the same. The results are shown in Table IV, below.

EXAMPLE 31

48.00 g (about 0.163 mole) of 3, 3', 4, 4'-biphenyltetracarboxylic dianhydride, 32.667 g (about 0.163 mole) of 4, 4'-diaminodiphenyl ether and 591.6 g of phenol were placed in an one liter volume autoclave equipped with an electromagnetic induction stirrer. Gaseous phase inside the autoclave was replaced by nitrogen, and then, the autoclave was closed. Then, the temperature of the content was raised to 170° C. (first stage) and, then, the content was maintained at that temperature for 20 hours (second stage), thereby to complete the polymerization accompanied by imidation. At the time the polymerization was completed, the total pressure of the reaction system was 1.5 kg/cm², and the content of water in the liquid reaction product was 0.88%. The rotation viscosity (as measured at 140° C.) of the liquid reaction product was 980 poise. The logarithmic viscosity of the polyimide contained in the liquid reaction product was 2.05.

EXAMPLE 32

Following a procedure similar to that mentioned in EXAMPLE 31, a polyimide solution was prepared wherein 10 g of water were incorporated in the content before the autoclave was closed, with all other conditions remaining substantially the same. At the time the polymerization was completed, the total pressure of the reaction system was 2.9 kg/cm$^2$, and the content of water in the liquid reaction product was 1.95%. The rotation viscosity (as measured at 140° C.) was 100 poise. The logarithmic viscosity of the polyimide contained in the liquid reaction product was 1.60.

What we claim is:

1. A process for preparing a polyimide solution, which comprises the step of polymerizing ingredients consisting essentially of:
   (A) a tetracarboxylic acid ingredient consisting of, based on the tetracarboxylic acid ingredient,
      (a) approximately 80 to 100% by mole of 3,3',4,4'-biphenyltetracarboxylic acid or its functional derivative and
      (b) 0 to 20% by mole of at least one compound selected from the group consisting of 2,3,3',4'-biphenyltetracarboxylic acid, 2,2',3,3'-biphenyltetracarboxylic acid, 3,3',4,4'-benzophenonetetracarboxylic acid, bis(3,4-dicarboxyphenyl) methane, 2,2-bis-(3,4-dicarboxyphenyl) propane, bis(3,4-dicarboxyphenyl) ether, bis(3,4-dicarboxyphenyl)thioether, bis(3,4-dicarboxyphenyl) sulfone, 2,3,6,7-naphthalenetetracarboxylic acid, pyromellitic acid and functional derivatives thereof, and
   (B) an aromatic diamine ingredient containing at least approximately 50% by mole, based on the aromatic diamine ingredient, of 4,4'-diaminodiphenyl ether, at a temperature of from approximately 100° to 300° C. in phenol or a halogenated phenolic compound; the amounts of the tetracarboxylic acid ingredient and the aromatic diamine ingredient being approximately equimolar to each other; whereby the tetracarboxylic acid ingredient and the aromatic diamine ingredient are polymerized, while being accompanied by imidation, to produce a homogeneous polyimide solution containing a polyimide having a logarithmic viscosity of from 0.7 to 6, as measured at 50° C., on a solution of 0.5 g polymer in 100 ml of p-chlorophenol.

2. A process according to claim 1 wherein the polymerization of the tetracarboxylic acid ingredient and the aromatic diamine ingredient, accompanied by imidation, is effected in two half stages: p1 in the first half stage, the tetracarboxylic acid ingredient and the aromatic diamine ingredient are heated in phenol or a halogenated phenolic compound to a temperature of from approximately 100° to 200° C. thereby to obtain a homogeneous polyimide solution having a rotation viscosity of not more than 50 poises as measured at 140° C., and;
   then, in the second half stage, the reaction mixture obtained in the first half stage is polymerized at a temperature of from approximately 100° to 300° C. in a closed reaction system at least until both the partial pressure of steam in the reaction system and the content of water in the liquid reaction mixture become constant.

3. A process according to claim 2 wherein prior to or at the beginning of the second half stage, not more than approximately 0.8 g of water per g of the polyimide is added to the reaction mixture.

4. A process according to claim 2 wherein the first half stage is conducted in the closed reaction system, and both the first and second stages are incessantly continued.

5. A process according to claim 4 wherein prior to or during the first and second half stages, not more than approximately 0.8 g of water per g of the polyimide to be finally produced is added to the reaction mixture to be polymerized.

6. A process according to claim 1, 2 or 4 wherein said tetracarboxylic acid ingredient is comprised of 3,3',4,4'-biphenyltetracarboxylic dianhydride.

7. A process according to claim 1, 2 or 4 wherein the ratio of the tetracarboxylic acid ingredient to the aromatic diamine ingredient is in the range of from 0.9 to 1.1 by mole.

8. A process according to claim 1, 2 or 4 wherein the halogenated phenolic compound has a melting point not higher than approximately 100° C. and a boiling point at normal pressure not higher than 300° C. and is expressed by the formula:

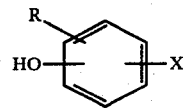

wherein X is a halogen selected from the group consisting of chlorine, bromine, iodine and fluorine and R is a hydrogen or an alkyl group having 1 to 4 carbon atoms.

9. A process according to claim 1, 2 or 4 wherein the total amount of the tetracarboxylic acid ingredient and the aromatic diamine ingredient is from 2 to 30% by weight based on the total amount of the tetracarboxylic acid ingredient, the aromatic diamine ingredient and the phenol or the halogenated phenolic compound.

10. A polyimide solution which has a rotation viscosity of 1 to 50,000 poise as measured at 140° C. and contains from 5 to 30% by weight of polyimide having a logarithmic viscosity of from approximately 0.7 to 6 as measured at 50° C. on a solution of 0.5 g polymer in 100 ml of p-chlorophenol and exhibiting a degree of imidation of at least 90%, said solution being prepared by a process defined in claim 1, 2 or 4.

11. The process of claim 1 wherein said tetracarboxylic acid ingredient contains 90 to 100% by mole, based on the tetracarboxylic ingredient, of 3,3',4,4'-biphenyltetracarboxylic acid or its functional derivative.

* * * * *

UNITED STATES PATENT AND TRADEMARK OFFICE
CERTIFICATE OF CORRECTION

PATENT NO. : 4,290,936

DATED : September 22, 1981

INVENTOR(S) : Yoshikazu Sasaki et al.

It is certified that error appears in the above—identified patent and that said Letters Patent is hereby corrected as shown below:

On The Title Page,
 Under the heading "Foreign Application Priority Data" change "59113558" to --54-113558--.

Claim 2, line 48, delete "pl" and begin a new paragraph.

Signed and Sealed this

Seventeenth Day of August 1982

[SEAL]

Attest:

GERALD J. MOSSINGHOFF

Attesting Officer

Commissioner of Patents and Trademarks